Figure 1:
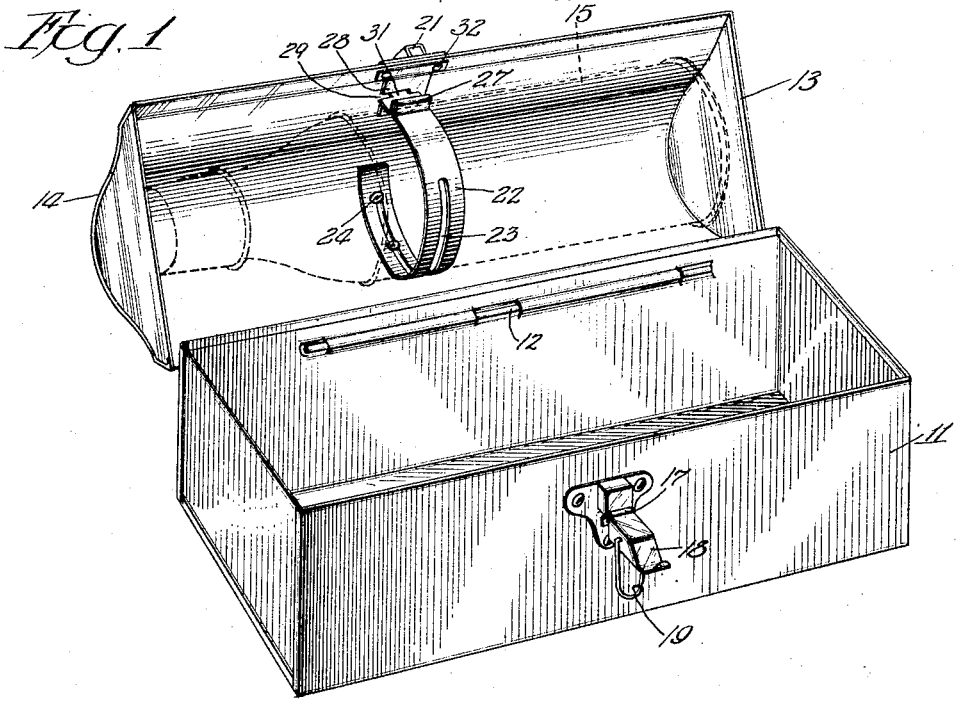

Dec. 27, 1927.  
H. B. KORWAN  
HOLDING DEVICE FOR LUNCH KITS  
Filed April 19, 1922

1,653,913

Inventor:
Harry B. Korwan
By: Munday, Clarke & Carpenter
Attys

Patented Dec. 27, 1927.

1,653,913

UNITED STATES PATENT OFFICE.

HARRY B. KORWAN, OF BROOKLYN, NEW YORK, ASSIGNOR TO AMERICAN CAN COMPANY, OF NEW YORK, N. Y., A CORPORATION OF NEW JERSEY.

HOLDING DEVICE FOR LUNCH KITS.

Application filed April 19, 1922. Serial No. 555,600.

This invention relates in general to containers of the lunch kit variety and has more particular reference to a device provided in such a container for holding a thermos bottle, or similar article.

It is an important object of the invention to provide a holding device for the purpose stated, which permits ready placement of the bottle, or other article, and subsequent movement of a holding member to holding position without requiring bending or undue strain upon said member.

Another object of the invention is the provision of a device of this character which, while readily movable to and from holding position, is adapted to securely hold the article in place when in such position.

A further object of the invention is the provision of a device of this character which may be cheaply manufactured and easily assembled and which employs a minimum amount of tin plate, or other material, in its construction.

Other objects and advantages of the invention will be apparent as it is better understood from the following description, which, taken in connection with the accompanying drawings, discloses a preferred embodiment thereof.

Figure 2:
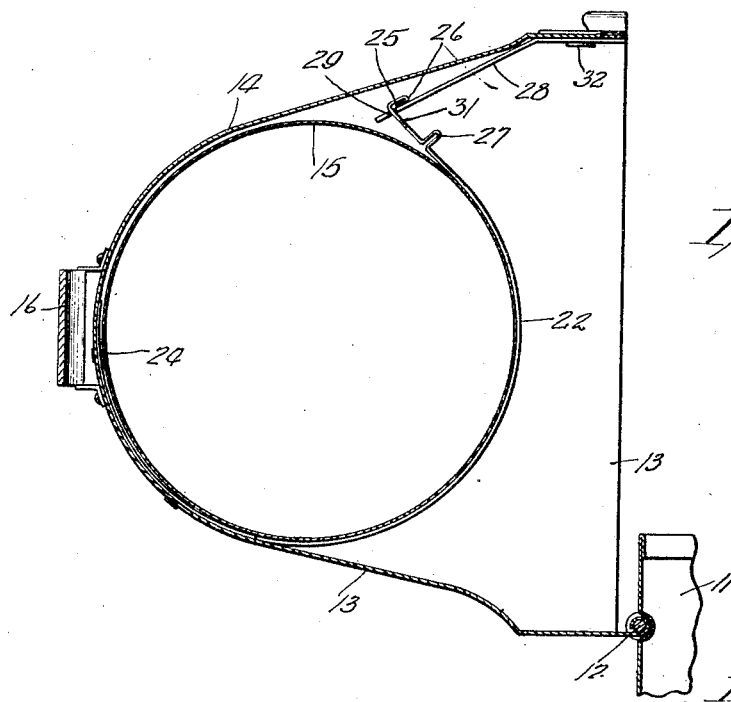

Referring to the drawings,

Figure 1 is a perspective view of a lunch kit in which my invention is embodied, the same being shown in open position and with the clip in its holding position; and Figure 2 is an enlarged transverse section, taken through the cover of the kit.

I have shown upon the drawings, as an illustrative embodiment of the invention, a lunch kit, comprising a receptacle or box 11, to which is hinged at 12 a cover 13, which may be of any desired form, but, in the present instance, is domed as indicated at 14 for the purpose of providing a compartment for a thermos bottle 15, or other article of cylindrical configuration. Upon the top of the cover may be provided a handle 16 and a latch 17 is provided at the front of the box, consisting, in the present instance, of a pivoted finger piece 18, carrying a swinging hook 19, adapted to engage a protuberance 21, which is grooved or recessed at the top to receive the hook 19, the latter being drawn into locking relationship when the finger-piece 18 is depressed.

The holding device which I have provided comprises a clip 22, which is centrally slotted, as indicated at 23, and extending into slot 23 are rivets, or other headed projections 24, adapted to permit sliding movement of the clip 22 while, at the same time, preventing the latter from being displaced. The forward end of the clip 22 is flanged, as shown at 25, and preferably the extremity of this flange is turned back upon itself at 26 to provide a smooth end. The material of the clip near this end is bent upon itself, to provide a projection 27, which may be engaged by the fingers to facilitate movement of said clip to and from its holding position and in bringing it into locked relationship, as will be hereinafter described.

Secured to the side of the cover opposite that from which the end of the clip extends when in its open position is a lug or keeper 28, which is provided with a slot 29 extending laterally and adapted to receive a reduced end 31 of the clip 22, it being noted that the slot 23 is of sufficient width, with respect to the stems of the rivets 24, to permit the requisite lateral movement for engaging the clip end 31 in said slot 29. The keeper 28 is secured to the wall of the cover by rivets 32, or in any desirable or preferred manner and it will be observed that said keeper is so formed as to cause the clip engaging portion thereof to be disposed at a distance from the interior of the cover. The flange 25 prevents withdrawal of the clip end by the weight of the bottle 15, so that the latter can only be removed by positively disengaging the clip from the keeper in the obvious manner.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

I claim:

1. An article holding device for lunch kits and the like, comprising a clip slidably secured to the interior of the kit and adapted to be drawn about the article when the latter is in position, and holding means adapted to receive and releasably hold an end of said clip.

2. An article holding device for lunch kits and the like, comprising a clip slidably secured to the interior of the kit and adapted to be drawn about the article when the latter is in position, and holding means adapted to receive and releasably hold an end of said clip, said means being provided with a laterally extending slot and the end of said clip being adapted to enter said slot from the side.

3. An article holding device for lunch kits and the like, comprising a clip slidably secured to the interior of the kit and adapted to be drawn about the article when the latter is in position.

4. An article holding device for lunch kits and the like, comprising a slotted clip movably secured to a wall of the kit and adapted to be drawn around the article, and means for engaging an end of said clip to hold the latter in article engaging position.

5. An article holding device for lunch kits and the like, comprising a slotted clip movably secured to a wall of the kit and adapted to be drawn around the article, and means for engaging an end of said clip to hold the latter in article engaging position, said clip being provided with a part readily engageable by the fingers for manual manipulation thereof.

6. A lunch kit, comprising a receptacle, a cover therefor, and a holding device for a thermos bottle or the like, said device comprising a clip slidably secured in said cover and adapted to be drawn around the bottle, and holding means for engaging an end of said clip when the latter is in its holding position.

7. A lunch kit, comprising a receptacle, a cover therefor, and a holding device for a thermos bottle or the like, said device comprising a clip slidably secured in said cover and adapted to be drawn around the bottle, and holding means for engaging an end of said clip when the latter is in its holding position, said means comprising a fixed lug provided with a laterally extending slot for receiving the end of said clip, and said clip having a lateral movement to enter said slot.

8. An article holding device for lunch kits and the like, comprising a resilient member slidably mounted on the interior of the kit and adapted to be drawn about the article and encircle the same when the latter is in position.

HARRY B. KORWAN.